J. M. BRILES.
SOIL PULVERIZER.
APPLICATION FILED FEB. 7, 1913.

1,107,891.

Patented Aug. 18, 1914.
2 SHEETS—SHEET 1.

Witnesses
William Smith
James A. Koehl

Inventor
J. M. Briles.

By Victor J. Evans
Attorney

J. M. BRILES.
SOIL PULVERIZER.
APPLICATION FILED FEB. 7, 1913.
1,107,891. Patented Aug. 18, 1914.
2 SHEETS—SHEET 2.
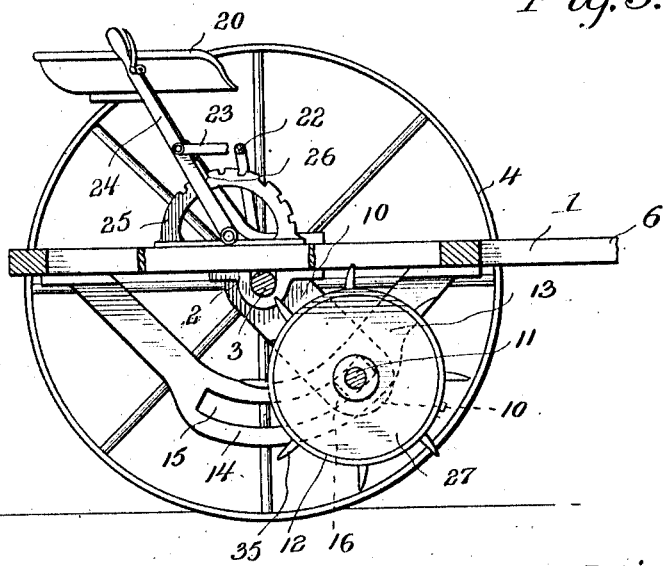
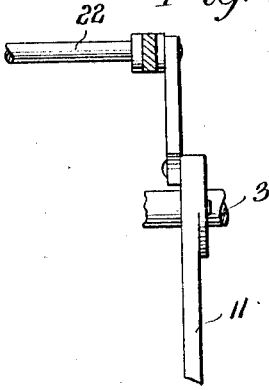
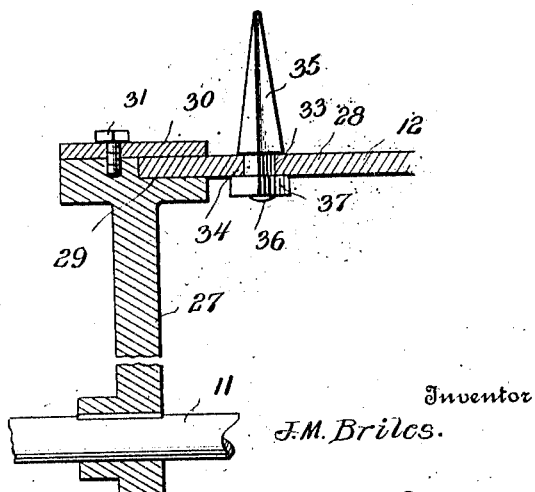
Inventor
J. M. Briles.
Witnesses
William Smith
By Victor J. Evans
Attorney

UNITED STATES PATENT OFFICE.

JAMES MONROE BRILES, OF ALICE, TEXAS.

SOIL-PULVERIZER.

1,107,891.   Specification of Letters Patent.   Patented Aug. 18, 1914.

Application filed February 7, 1913. Serial No. 746,895.

*To all whom it may concern:*

Be it known that I, JAMES M. BRILES, a citizen of the United States, residing at Alice, in the county of Jim Wells and State of Texas, have invented new and useful Improvements in Soil-Pulverizers, of which the following is a specification.

This invention relates to soil pulverizers; and it has for its object the provision of a machine of this character which will thoroughly pulverize the soil as the machine is propelled across the ground and which will embody a pulverizing drum and means for facilitating the adjustment of the drum to operative and inoperative positions, respectively.

Another object of the invention is the provision of a hanger for the pulverizing drum and gearing on the hanger for connecting the drum with one of the supporting wheels of the machine and for causing the drum to revolve at a high speed of movement.

Another object of the invention is the provision of means for adjusting the pulverizing drum so as to permit the same to be effectually disposed above the surface of the ground when the machine is traveling to and from the field.

A further object of the invention is the provision of power transmitting mechanism which will be constantly associated with the driving element of the machine, so as to prevent the gearing from being stripped during the operation of throwing the drum to different positions relatively to the surface of the ground.

With these and other objects in view, the invention consists of certain novel features of construction, combination and arrangement of parts, as will be hereinafter described and claimed.

Figure 1:
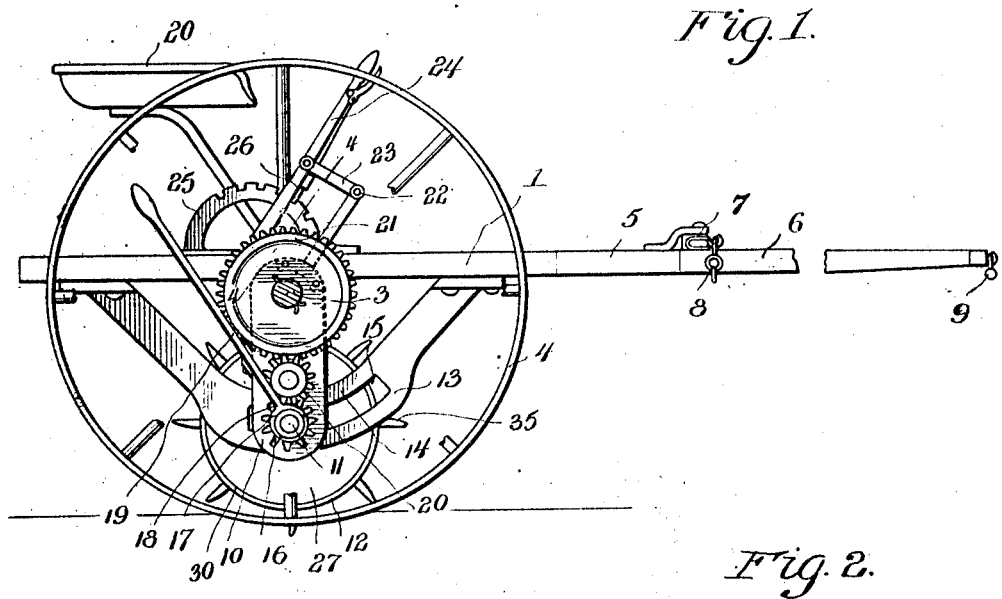
Figure 2:
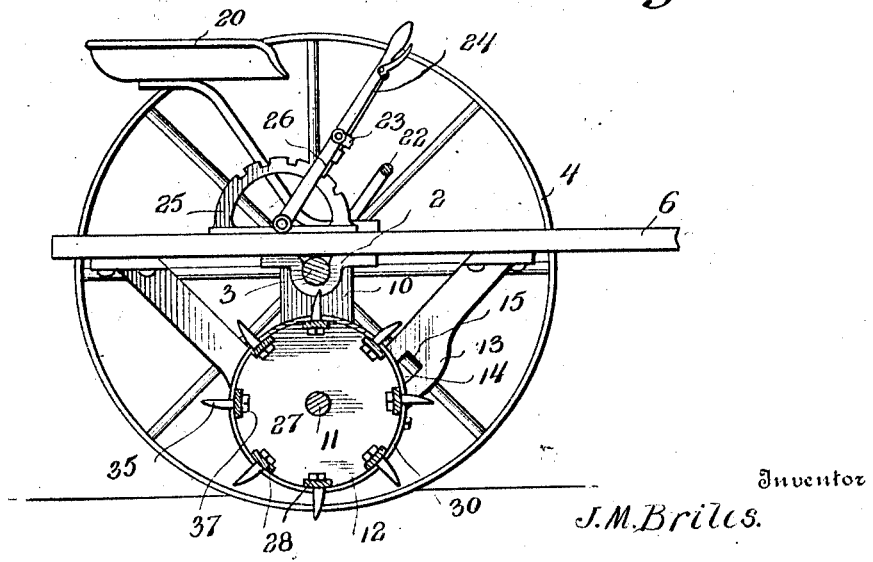

In the accompanying drawings:—Figure 1 is a side view of the machine; Fig. 2 is a longitudinal section therethrough, showing the pulverizing drum in an operative position; Fig. 3 is a similar view, showing the pulverizing drum in an inoperative position; Fig. 4 is a section on line 4—4 of Fig. 1; and Fig. 5 is a section on an enlarged scale of a portion of the drum, showing the manner of connecting the pulverizing teeth therewith.

The machine comprises a portable frame 1, which is provided at its opposite sides with alined bearings 2, wherein revolves an axle 3, the latter having its ends provided with fixed relatively large ground wheels 4. The frame includes front braces 5, which are connected to the rear ends of a draft pole 6. This pole is of a type which will accommodate two draft animals, and it is shown to include a doubletree 7 having the usual swingletrees 8 at the opposite sides of the pole and a neck-yoke 9, the latter being connected in the usual well known manner to the tip of the pole. The axle 3 is provided with swinging bearing arms 10, whose lower ends are provided with bearings which receive the shaft 11 of a pulverizing drum 12. The side bars of the frame 1 are provided with guide and supporting brackets 13, which are provided with lower relatively large guiding portions 14 having slots 15 therein which are concentrically disposed with relation to the axis of the supporting wheels 4 and which receive sliding boxes 16 on the shaft 11 of the pulverizing drum. The shaft 11 is provided with a gear wheel 16 having a clutch element 17, which is adapted to be engaged by a sliding clutch element 18, which is splined to the shaft 11 and connected with a shifting lever 19, which extends upwardly in the direction of the driver's seat 20 of the machine whereby it may be grasped at the convenience of the operator to permit the interfitting clutch elements to be thrown into operative engagement, thereby rendering the gear 16 operative for driving the pulverizing drum. One of the swinging bearing brackets 10 is provided with an idle gear wheel 20, which meshes with the gear wheel 16 and with a relatively large gear wheel 21, which is fixed to one of the supporting wheels 4 of the machine. The two members 10 of the pulverizing drum structure are connected with each other by a bail 22. This bail is operatively connected through the medium of a link 23 with a regulating lever 24. The lever is mounted in any suitable well known manner upon the frame 1 and associated with a rack element or quadrant 25 to the frame whereby a locking pawl 26 of the lever may be thrown into the desired notch of the quadrant to hold the brackets 10 in required adjusted position.

The drum 12 comprises companion heads 27, which are fixed to the shaft 11 and transverse toothed bars 28 which lie parallel with said shaft and which are terminally fitted in rectangular recesses 29 in the peripheral surfaces of the heads. The heads are embraced by removable bands 30, which may be secured to the heads by lag-bolts 31 and which are provided with inwardly projecting securing portions 32 which close the recesses 29 and which operate to confine the extremities of the toothed bars 28 therein. The toothed bars are provided with rectangular passages 33, which receive correspondingly formed shanks 34 of teeth 35. The shanks are provided with threaded ends 36 which receive clamping nuts 37, the latter being adjusted against the inner surfaces of the bars, so as to hold the teeth in their applied position.

From the construction of the machine described, it is evident that the pulverizing drum is capable of concentric adjustment relatively of the axle 3 of the supporting wheels of the machine, so that at the discretion of the operator, the drum may be thrown into an operative or inoperative position. By providing the members 10 which support the drum for swinging movements, it is evident that the gear train between the drum and the driving gear wheel 21 will be arranged in constant intermeshing engagement, irrespective of the adjustment of the drum and as a consequence I entirely eliminate any stripping of the teeth of the gears when adjusting the drum to its driven position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

A pulverizing machine comprising a frame, a wheeled axle journaled in the frame, the said axle being provided with a gear, bracket members depending from the frame and each comprising upwardly flared arms attached to the underside of the frame and a curved portion connecting the lower ends of the arms and extending beneath the axle, the said connecting curved portion of each of the brackets having an arcuate slot therein, one end of the slot terminating at the juncture of the curved portion with one of the flaring arms, and the opposite end of the slot being extended to the other of the bracket arms, members swingingly mounted on the axle and depending therefrom, one of the members being provided with a gear adapted to engage the gear on the axle, a pulverizing drum disposed below the frame and having an axle extending through the slots in the connecting curved portion in the bracket, the said axle of the pulverizing drum having a gear loosely mounted thereon and engaging the gear on the swinging member, boxes mounted on the axle of the pulverizing drum and slidable in the slots in the brackets, said boxes being adapted when the drum is in one position to engage the end wall of the first mentioned end of the arcuate slots and when in another position to engage the walls of the second mentioned end of the slots, and means slidable on the axle of the drum and adapted to engage the gear on the said axle whereby to impart rotary motion to the drum.

In testimony whereof I affix my signature in presence of two witnesses.

JAMES MONROE BRILES.

Witnesses:
W. A. HINNANT,
L. F. FRAZIER.

---

Copies of this patent may be obtained for five cents each, by addressing the "Commissioner of Patents, Washington, D. C."